(12) United States Patent
Lochry et al.

(10) Patent No.: US 11,181,445 B2
(45) Date of Patent: Nov. 23, 2021

(54) DEVICES, SYSTEMS AND METHODS, AND SENSOR MODULES FOR USE IN MONITORING THE STRUCTURAL HEALTH OF STRUCTURES

(71) Applicant: HEURISTIC ACTIONS, INC., Las Vegas, NV (US)

(72) Inventors: James C. Lochry, Las Vegas, NV (US); Paul L. Cowell, Mountain View, CA (US)

(73) Assignee: HEURISTIC ACTIONS, INC., Las Vegas, NV (US)

( * ) Notice: Subject to any disclaimer, the term of this patent is extended or adjusted under 35 U.S.C. 154(b) by 167 days.

(21) Appl. No.: 15/802,644

(22) Filed: Nov. 3, 2017

(65) Prior Publication Data
US 2018/0136085 A1 May 17, 2018

Related U.S. Application Data

(60) Provisional application No. 62/423,729, filed on Nov. 17, 2016.

(51) Int. Cl.
*G01M 99/00* (2011.01)
*G01M 5/00* (2006.01)
*G01B 21/32* (2006.01)

(52) U.S. Cl.
CPC .......... *G01M 99/004* (2013.01); *G01B 21/32* (2013.01); *G01M 5/0008* (2013.01)

(58) Field of Classification Search
CPC .......... G06F 21/32; G07C 2009/00801; G07C 9/00071; G07C 9/00309; G07C 9/00563;
(Continued)

(56) References Cited

U.S. PATENT DOCUMENTS 4,480,480 A 11/1984 Scott et al.
5,421,204 A 6/1995 Svaty
(Continued)

FOREIGN PATENT DOCUMENTS

JP  2006170861      6/2006
JP  2006170861 A  * 6/2006
(Continued)

OTHER PUBLICATIONS

Chang, Fu-Kuo, Structural Health Monitoring 2003, From Diagnostics & Prognostics To Structural Health Management, DES Publications, Inc. (2003), p. 103 et passim.
(Continued)

*Primary Examiner* — Nimeshkumar D Patel
*Assistant Examiner* — Gedeon M Kidanu
(74) *Attorney, Agent, or Firm* — FisherBroyles, LLP; Victoria L. Boyd; James Pohl

(57) ABSTRACT

A structural health monitoring system is provided comprising sensors and/or sensor modules attached to, or near to, one or more parts or regions of a structure that detect and measure data regarding physical or related features or phenomena associated with the structure before, during and after a load or other event impacting or otherwise affecting the structure. The sensor modules measure and convert the detected phenomena into digital data and transmit the data to a master station for data compilation, storage and analysis. The master station is configured to produce analytic work product based on sensed phenomena which is useful for assisting inspectors in determining what action to take with respect to a structure's health after an event.

24 Claims, 12 Drawing Sheets

(58) Field of Classification Search
CPC .............. G01M 99/004; H04M 1/7253; H04M 1/72533; H04M 2250/02; H04M 2250/74; H04W 12/06; H04W 4/80; H04W 76/14; H04W 76/50

See application file for complete search history.

(56) References Cited

U.S. PATENT DOCUMENTS

| | | | |
|---|---|---|---|
| 5,507,188 | A | 4/1996 | Svaty |
| 5,526,694 | A | 6/1996 | McEachern et al. |
| 5,948,984 | A | 9/1999 | Hedberg |
| 6,012,337 | A | 1/2000 | Hodge |
| 6,181,841 | B1 | 1/2001 | Hodge |
| 6,292,108 | B1 * | 9/2001 | Straser .................. G01B 21/32 340/539.1 |
| 6,549,834 | B2 | 4/2003 | McClellan et al. |
| 6,661,346 | B1 | 12/2003 | Wood et al. |
| 6,862,528 | B2 | 3/2005 | Scannell et al. |
| 8,618,934 | B2 * | 12/2013 | Belov ..................... G01M 5/00 340/539.3 |
| 8,686,850 | B2 | 4/2014 | Zeng et al. |
| 9,267,862 | B1 † | 2/2016 | Kavars |
| 2010/0242609 | A1 * | 9/2010 | Lee ..................... G01M 5/0008 73/594 |
| 2010/0271199 | A1 * | 10/2010 | Belov ................ G01M 5/0008 340/539.3 |
| 2011/0029276 | A1 | 2/2011 | Martin |
| 2014/0067284 | A1 | 3/2014 | Breed |
| 2014/0012517 | A1 | 9/2014 | Cheung et al. |
| 2014/0361888 | A1 | 12/2014 | Huang et al. |
| 2015/0247754 | A1 | 9/2015 | Zemp et al. |
| 2016/0054460 | A1 | 2/2016 | Jackson et al. |
| 2016/0217226 | A1 * | 7/2016 | Westcott ................ G06F 30/13 |
| 2017/0124448 | A1 * | 5/2017 | Engel .................... G06F 11/008 |
| 2017/0325731 | A1 * | 11/2017 | D'Aquila ............. G01C 21/206 |
| 2020/0004655 | A1 * | 1/2020 | Abrami .............. G06K 9/00557 |

FOREIGN PATENT DOCUMENTS

| | | |
|---|---|---|
| JP | 2010210335 | 9/2010 |
| JP | 2010210335 A * | 9/2010 |

OTHER PUBLICATIONS

International Preliminary Report on Patentability and Written Opinion of the ISA dated May 21, 2019, issued in copending International Patent Application No. PCT/US2017/059836, 7 pgs.

Chintalapudi et al., Monitoring Civil Structures with a Wireless Sensor Network, IEEE Internet Computing, Mar.-Apr. 2006.

Farrar et al., Sensor network paradigms for structural health monitoring, Research Gate, Structural Control and Health Monitoring—Jan. 2006.

Kottapalli et al., Two-Tiered wireless sensor network architecture for structural health monitoring, Proceedings of SPIE vol. 5057 (2003).

Paek et al., A Wireless Sensor Network for Structural Health Monitoring: Performance and Experience, Center for Embedded Network Sensing, Univ. Cal., May 5, 2005.

Paek et al., The Performance of a Wireless Sensor Network for Structural Health Monitoring, Computer Science Department, University of Southern California, Los Angeles, California, 2004.

Pakzad et al., Design and Implementation of Scalable Wireless Sensor Network for Structural Monitoring, Journal of Infrastructure Systems, vol. 14, No. 1, Mar. 1, 2008.

Rice et al., Flexible smart sensor framework for autonomous full-scale structural health monitoring, NSEL Report Series, Report No. NSEL-018, Aug. 2009.

Torfs et al., Low Power Wireless Sensor Network for Building Monitoring, IEEE Sensors Journal, vol. 13, No. 3, Mar. 2013.

Xu et al., A Wireless Sensor Network For Structural Monitoring, SenSys '04, Nov. 3-5, 2004.

Matsuya et al., "Development of lateral displacement sensor for real-time detection of structural damage", IEEJ Transactions on Electrical and Electronic Engineering, IEEJ Trans, 2011, 6:166-272.

Japanese Office Action for Patent Application No. 2019-547576, dated Jul. 14, 2021.

Lloyd, J.B. and Connor, R.J., "Development and Verification of Web-based Bridge Monitoring Interface"; Publication FHWA/IN/JTRP-2013; Joint Transportation Research Program, Indiana Department of Transportation and Purdue University, West Lafayette, IN (2013).†

Rice, J. and Spencer Jr., B., "Flexible Smart Sensor Framework for Autonomous Full-scale Structural Health Monitoring"; Newmark Structural Engineering Laboratory at the University of Illinois at Urbana-Champaign (Aug. 2009); available at: https://www.researchgate.net/publication/32966901_Flexible_Smart_Sensor_Framework_for_Autonomous_Full-scale_Structural_Health_Monitoring.†

Paek, J. et al., "A Wireless Sensor Network for Structural Health Monitoring: Performance and Experience"; EmNetS-II, pp. 19; IEEE (2005).†

Arms, S.W. et al., "Remotely Reprogrammable Sensors for Structural Health Monitoring"; Structural Materials Technology Conference: NDE/NDT for Highways and Bridges; Buffalo, NY; (Sep. 16, 2004).†

Lynch, J.P. and Loh, K.J., "A Summary Review of Wireless Sensors and Sensor Networks for Structural Health Monitoring"; Shock and Vibrations Digest, vol. 38, No. 2, pp. 91-130 (Mar. 2006).†

\* cited by examiner
† cited by third party (NOT TO SCALE)

ANALYTICS: TOP LEVEL BLOCK DIAGRAM
- EXTERNAL INTERFACES SHOWN IN DOTTED-LINE BOXES
- USERS HAVE ACCESS TO ALL INTERMEDIATE DATA INCLUDING RAW FILES, AWP, AND MODELS

ANALYTICS: PROCESS EVENT BLOCK DIAGRAM
- EXTERNAL INTERFACES SHOWN IN DOTTED-LINE BOXES

PREPROCESS EVENT

- SET UP STRUCTURE PARAMETERS
- STRUCTURE DEFINITION
  - TYPE
  - MATERIALS
  - DEFINE COORDINATE SYSTEM AND TRANSFORMATIONS
  - NODE AND MEMBER POSITIONS
  - MEMBER TYPE
  - MEMBER DIMENSIONS
- SENSOR PARAMETERS
  - ID
  - TYPE
  - LOCATION
  - CONNECTIVITY
  - DATA FILE PATH
- SET UP PROCESSING PARAMETERS
  - FILTER PARAMETERS
  - DECIMATION FACTOR
- LOAD SIGNAL DATA FROM ALL SENSORS FOR ONE EVENT
- EXTRACT HEADER INFORMATION
  - SENSOR TYPE
  - SENSOR PARAMETERS
    - RANGE
    - RATE
    - MODE
  - RECORD START TIME
  - RECORD END TIME
- EXTRACT EVENT DATA FROM RECORD
  - CHECK FOR VALID EVENT DATA PRESENT
  - CONFIRM EVENT TYPE IS EITHER DYNAMIC OR DEAD-LOAD CONDITION DATA
  - COMPUTE EVENT TIME BY SENSOR
  - CONVERT TO STRUCTURE COORDINATES
- INITIALIZE FEATURE DATA

FIG. 7A

ANALYZE KINEMATICS
- CONVERT SIGNALS TO COMMON RATE
- CALIBRATE SIGNALS
- CONVERT SIGNALS TO PHYSICAL UNITS
- CONDITION SIGNALS
  - NOISE REDUCTION
- DECIMATE SIGNALS TO DESIRED BANDWIDTH
- DETERMINE EVENT CHARACTERISTICS
  - DURATION
  - ENERGY LEVEL
  - VELOCITY
- CALCULATE KINEMATIC QUANTITIES FOR EACH SENSOR
  - LINEAR ACCELERATION
    - ACCELERATION COMPONENTS x, y, z
    - ACCELERATION MAGNITUDE
    - VELOCITY COMPONENTS x, y, z
    - VELOCITY MAGNITUDE
    - DISPLACEMENT COMPONENTS x, y, z
    - DISPLACEMENT MAGNITUDE
  - ANGULAR VELOCITY
    - ANGULAR VELOCITY COMPONENTS x, y, z
    - ANGULAR VELOCITY MAGNITUDE
    - ANGLE OF ROTATION COMPONENTS x, y, z
    - ANGLE OF ROTATION MAGNITUDE
  - ORIENTATION
    - DIRECTION OF GRAVITY VECTOR COMPONENTS x, y, z
    - DIRECTION OF MAGNETIC FIELD COMPONENTS x, y, z
  - CORRECT LINEAR ACCELERATION USING GYROSCOPE SIGNAL DATA FOR EACH SENSOR
  - SYNCHRONIZE EVENT TIMING ACROSS ALL SENSORS
    - EVENT DELAYS AMONG SENSORS
    - CALCULATE EVENT VELOCITY
    - SIGNAL PROPAGATION TIMES

*FIG. 7B*

ANALYZE FREQUENCY OF DYNAMIC EVENT TYPE
• CALCULATE PARAMETERS FOR IMPULSIVE AND SHORT DURATION SIGNALS
    • TIME
    • AMPLITUDE
    • ENVELOPE
    • FREQUENCY AND DECAY RATE
    • DAMPING AND STIFFNESS
    • FREQUENCY BAND WIDTH

• CALCULATE PARAMETERS FOR LONG DURATION SIGNALS
    • FREQUENCY OF EACH MODE
    • LINEARITY OF EACH MODE
    • AMPLITUDE AND ENVELOPE
    • DAMPING AND STIFFNESS
    • BANDWIDTH

*FIG. 7C*

ANALYZE MODES FOR DYNAMIC AND DEAD-LOAD TYPE EVENTS
- CALCULATE BASIC STRUCTURE MODES OF MOTION UNDER DYNAMIC LOADING
    - CORRELATION DISPLACEMENTS
    - OSCILLATION PATTERN IN VERTICAL, TRANSVERSE, AND LONGITUDINAL DIRECTIONS

- CALCULATE SIGNAL PROPAGATION TIMES USING TIME-ALIGNED SENSOR DATA
    - IMPULSE SIGNAL CORRELATION BETWEEN SENSOR PAIRS
    - INTER-SENSOR SIGNAL PROPAGATION TIMES
    - INTERVENING STRUCTURAL MEMBER STIFFNESS
    - INTERVENING STRUCTURAL MEMBER TRANSMISSION AMPLITUDE

- CALCULATE STRUCTURE TILT ANGLES
    - TILT ANGLE BASED ON ACCELERATION
    - TILT ANGLE BASED ON MAGNETOMETER

- CALIBRATE SENSORS FOR DYNAMIC ANALYSIS USING DEAD LOAD EVENT
    - ACCELERATION ZERO POINTS IN x, y, AND z COORDINATES
    - GYROSCOPE ZERO POINTS IN x, y, AND z COORDINATES
    - MAGNETOMETER ZERO POINTS IN x, y, AND z COORDINATES

*FIG. 7D*

EXTRACT FEATURES
- CALCULATE STATIC EVENT FEATURES
    - TILT ANGLES USING ACCELERATION AND MAGNETOMETER DATA
    - NOISE LEVELS IN ALL SENSOR CHANNELS
    - CALIBRATION DATA
- CALCULATE KINEMATIC FEATURES
    - EVENT TYPE
    - EVENT DURATION
    - ENERGY LEVEL
    - DISPLACEMENT AMPLITUDE MEAN, MAXIMA, AND VARIABILITY
    - IMPULSE SIGNAL COUNT AND MAGNITUDE
    - ROTATION AMPLITUDE MEAN, MAXIMA, AND VARIABILITY
- CALCULATE FREQUENCY FEATURES
    - STRUCTURAL ELEMENT STIFFNESS, DAMPING
    - FREQUENCY MODES AND LINEARITY
- CALCULATE STRUCTURE MODES OF MOTION
    - MODE TYPE, AMPLITUDE, FREQUENCY
    - TILT ANGLES
    - PROPAGATION TIMES, STIFFNESS, AND TRANSMISSIVITY

*FIG. 7E* ns and methods, and
sensor modules for use in
monitoring the structural health
of structures

I. RELATED APPLICATIONS

The present application claims priority to U.S. Provisional Patent Application No. 62/423,729, filed Nov. 17, 2016, the entire contents of which are incorporated by reference herein.

II. FIELD OF THE INVENTION

The present invention relates to devices, systems and methods for the monitoring and assessment of the state and health of structures such as bridges, railways, highways, dams, levees, walls, tunnels, buildings and the like, and sensors used in detecting phenomena relating to structural health.

III. BACKGROUND OF THE INVENTION

The present invention relates to the monitoring of the structural health of buildings, dams, bridges, and other structures, and includes systems and equipment that measure certain states of a structure, as well as multiple structures, over time, and after events affecting the structure(s).

The art concerning the measurement of structural events includes a number of references.

U.S. Pat. No. 5,526,694 issued Jun. 18, 1996 to McEachern purports to disclose an electronic measuring instrument that measures and records the acceleration frequency spectra of a multi-story building while it is excited by wind, said frequency spectra are said to be indicative, in part, of structural stiffness, and wherein a traumatic structural event occurs, such as an earthquake, an explosion, or a hurricane, changes in wind-excited frequency spectra are used to detect hidden structural damage to the building.

U.S. Pat. No. 6,292,108 B1 issued Sep. 18, 2001 to Straser, et al., purports to disclose a structural monitoring system comprising battery powered data acquisition devices that transmit structural information to a central data collection device over a wireless data link. The data acquisition device is said to comprise mechanical vibration sensors, data acquisition circuitry, a digital wireless transmitter, and a battery for providing electrical power to the device. Straser et al further says that their central data collection device comprises a digital wireless receiver that receives data sent from the data acquisition device, and a microprocessor for processing the data.

U.S. Pat. No. 6,661,346 B1 issued Dec. 9, 2003 to Wood et al. purports to disclose a safety system for a building having an earthquake detector circuit for detecting ground accelerations exceeding a threshold acceleration/frequency curve dividing safe and hazardous ground accelerations throughout a predetermined frequency range, comprising an accelerometer for measuring linear acceleration along an axis, and for generating an acceleration signal indicative of a magnitude of the measured acceleration, wherein a filter circuit produces a filtered acceleration signal from the acceleration signal, and wherein a threshold circuit compares the filtered acceleration signal to a predetermined threshold voltage, and produces an earthquake detected signal indicative of the comparison result.

United States Patent Application No. US 2011/0029276 A1 to Cabral Martin, publication date Feb. 3, 2011, purports to disclose a system and procedure for monitoring the distortions in a stationary or moving structure, due to the various effects thereupon; it being said that the system and procedure are comprised of a plurality of inclinometers, at least one gyroscope, and a plurality of accelerometers distributed throughout the structure.

U.S. Pat. No. 8,410,952 B2 issued Apr. 2, 2013 to Abercrombie et al. purports to disclose a method wherein a sensor such as an accelerometer is placed on a physical structure and tri-axial accelerometer data is converted to mechanical power data which is then processed to provide a forewarning of a critical event concerning the structure, the forewarning being based on a number of occurrences of a composite measure of dissimilarity exceeding a forewarning threshold over a defined sampling time, and wherein a forewarning signal is provided to a human observer through a visual, audible or tangible signal.

U.S. Pat. No. 8,618,934 B2 issued Dec. 31, 2013 to Belov et al. purports to disclose a system and a method of long-term condition monitoring of structures that are based on the use of autonomous sensing modules, centers for storing and processing data and software for data analysis wherein an autonomous sensing module contains a set of sensors for measurements of parameters related to the condition of a monitored structure, a non-volatile memory, a wireless data transfer unit, a controller, a clock circuit, a battery, an energy harvesting device and a power management unit.

United States Patent Application 2014/0012517 A1 to Cheung et al., publication date Jan. 9, 2014, purports to disclose a method of assessing structural damage to a building based on measurement of point rotations using MEMS accelerometer sensors attached to structural columns of a building wherein measured point rotations are wirelessly transmitted to a central unit which estimates residual drifts of the structural columns using a model of plastic deformation of the columns that incorporates empirically predetermined structural parameters of the columns such as a height of a column plastic bending point or a column curvature coefficient, and wherein structural damage is then estimated by determining a damage state from performance-based earthquake engineering performance thresholds that relate residual drift to damage.

U.S. Pat. No. 8,686,850 B2 issued Apr. 1, 2014 to Zeng et al. purports to disclose the detection of seismic movements and providing at least one alarm notification based on the detected seismic movement, and, particularly, a sensor device, which may be positioned in a subterranean part of a structure that may detect a seismic movement, may make a determination as to whether the received seismic movement is greater than a predetermined threshold, and wherein if the seismic movement is greater than a predetermined threshold, the sensor device may transmit an alarm notification to one or more alarm devices.

Other references include Chintalapudi et al., *Monitoring Civil Structures with a Wireless Sensor Network*, IEEE INTERNET COMPUTING, March-April 2006; Kottapalli et al., *Two Tiered wireless sensor network architecture for structural health monitoring*, Proceedings of SPIE Vol. 5057 (2003); Farrar et al., *Sensor network paradigms for structural health monitoring*, Research Gate, STRUCTURAL CONTROL AND HEALTH MONITORING—January 2006; Torfs et al., *Low Power Wireless Sensor Network for Building Monitoring*, MEMSCON project, www.memscom-.com; Xu et al., *A Wireless Sensor Network For Structural Monitoring*, SenSys '04, Nov. 3-5, 2004; Rice et al., *Flexible smart sensor framework for autonomous structural health monitoring*, Smart Structures and Systems, Vol. 6, No. 5-6

(2010) 423-438; Pakzad et al., *Design and Implementation of Scalable Wireless Sensor Network for Structural Monitoring*, JOURNAL OF INFRASTRUCTURE SYSTEMS, Vol. 14, No. 1, Mar. 1, 2008, and Paek et al., *A Wireless Sensor Network for Structural Health Monitoring: Performance and Experience*, Center for Embedded Network Sensing, Univ. Cal., May 5, 2005.

The foregoing references are incorporated into this specification by reference and as if the contents of said references were fully set forth herein in their entirety.

IV. OBJECTS OF THE INVENTION

One object of the present invention is to provide a scalable structural health monitoring system and device that will conduct strategic asset management of structures wherein said structures can be placed into decision categories wherein the optimal management of a structure, based upon the health of the structure, can be determined and implemented. By way of example only, the present invention assists inspectors and pertinent decision makers to decide or determine whether a replacement of the structure is required or economically preferable, or that the long term good health of the structure is likely.

Another object of the present invention is to provide a scalable structural health monitoring system and device that will conduct strategic asset management of structures wherein said structures can be placed into further decision categories wherein, by way of example, the present invention assists inspectors and pertinent decision makers to decide or determine (1) whether a structure is in need of repair, replacement or other potential remedies, and (2) what degrees of urgency or priorities are present concerning the health of the structure with respect to the structure's repair, replacement, or other potential remedies.

Another object of the present invention is to provide a scalable structural health monitoring system and device that monitors a structure's health over time and assists with ongoing inspection and maintenance of the structure through the structure's lifecycle.

Another object of the present invention is to provide a scalable structural health monitoring system and device that achieves rapid assessment of the structure's integrity and safety during an atypical event such as rapid scour, collision, derailment, or earthquake.

Another object of the present invention is to assist and improve the work of human inspection of structures by providing objective and timely observations that both complement and supplement current methods based largely on visual examination of the structure.

Another object of the present invention is to provide a novel sensor module for use in structural health monitoring.

V. SUMMARY OF THE INVENTION

The present invention comprises structural health monitoring devices, systems and methods for use in monitoring the state of a structure after an event affecting or impacting the structure or over the course of time.

By way of example only, the present invention can be utilized to monitor and assess the health of structures such as railways, highways, dams, levees, walls, tunnels, buildings, substructures and foundations, retaining walls, bridges, including steel bridges (together with plate girders, truss, and fracture critical steel bridges), concrete bridges, stone and masonry bridges, and timber bridges.

In an embodiment, the invention is comprised of sensors and sensor modules attached to, or near to, one or more parts or regions of a structure for detecting and measuring data regarding physical or related features or phenomena associated with the structure before, during and after a load or other event impacting or otherwise affecting the structure. The sensor modules created by the inventors measure and convert the detected phenomena into digital data and transmit the data to a master station for data compilation, storage and analysis.

The master station is comprised of a computing device that is specially configured and programmed to gather or harvest the data transmitted by the sensor modules to the master station, and to perform certain operations on the data. For example, in an embodiment of the present invention, the master station, in conjunction with the sensor modules, and one or more programmed algorithms, executes said programs and performs various analyses and operations on the data to generate work product that represents various states and features of the structure, or portions thereof, and generates output comprising transformed data, information, reports, advisories, and the like, which advise and assist others, such as human inspectors of the structure, to better and more efficiently monitor and diagnose the health or state of the structure over time, or after an event affecting the structure, or to determine whether action should be taken to replace, repair or remedy the structure. In its present state, the present invention does not diagnose the causes of structural events; rather, the present invention assists inspectors or other professionals, who are those solely responsible for structural diagnosis, by providing objective evidence concerning the state of the structure under consideration.

The master station in conjunction with programmed algorithms and configurations produces data and information concerning sensed physical structural measurements and features, including, by way of example, kinematics, frequency analysis and mode analysis and resultant work product. For example, as set forth more fully below, the analytic work product produced by the operations of the sensors, sensor modules and the master station, and their associated parts and features, includes kinematic quantities describing the motion of structural components based on the acceleration and angular rotation measured by the sensors, resonance frequencies whereby changes in the resonant frequency of vibration indicate changes in the behavior of the structure, and modes of oscillation, and whereby using time-aligned kinematic quantities, the modes of oscillation in the vertical, lateral, and longitudinal directions of a structure which are extracted and visualized, as by way of example, moving or oscillating waves, rotations, twists, and swaying.

In an embodiment, the system of the present invention is scalable, and a matrix of multiple systems and structures can be created whereby multiple master stations take data collected over a period and transmit it to a central server(s). The central server sees the data files for many structures, such as bridges, and generate multiple reports from all collected bridges. Thus, the present invention provides analytics, reports and data from an entire railway system. In so doing, the present invention can analyze data for each bridge, and compile an historical record for a bridge that is used to create an updatable bridge model comprising each measured parameter, and create trend lines for an historical record for further use.

In an embodiment of the present invention, the sensor modules transmit data to the master station wirelessly, e.g., via WIFI.

In an embodiment of the present invention, the master station transmits data or instructions to the sensor modules wirelessly, e.g., via WIFI.

In an embodiment of the present invention, the sensor modules are in a quiescent state, enabling them to save power.

In an embodiment of the present invention, the sensor modules are in a dynamic state wherein the sensors are taking readings of the structure during which the structure is undergoing dynamic or traumatic events.

In an embodiment of the present invention, the sensor modules take readings of the structure wherein said structure is experiencing load.

In an embodiment of the present invention, the sensor modules are mounted or connected to a bridge, including a railway bridge, and take readings of the bridge before, during and after a train moves over the bridge.

In an embodiment of the present invention, the sensor modules use standard clock time.

In an embodiment of the present invention, a given sensor module is comprised of one or several types of sensors, such as an accelerometer, gyroscopic sensor, magnetometer or combinations thereof.

In an embodiment of the present invention, the sensor modules are comprised of a support means, such as a printed circuit board, and one or more of the following components: sensor(s), battery, solar power unit, programmable logic unit, memory, digitizer(s), WIFI device(s) and links, including antennae.

In an embodiment, the present invention utilizes several sensor modules are placed at several parts of a given structure so that the system monitors and assesses various sections of the structure, or the structure as a whole.

In an embodiment, the sensor modules are configured or programmed to perform data processing, including triggering computations or data cleansing.

In an embodiment of the present invention, master station is configured to send instructions to one or more of quiescent sensor modules to "wake up," activate or change state.

In an embodiment of the present invention, the master station transmits data and analyses to one or more central servers for further data storage, processing, analysis or output generation.

In an embodiment, the present invention creates a "structure model," wherein the physical state of the structure is periodically updated as monitoring cycles take place.

In an embodiment, the present invention, based on predetermined criteria, assesses whether all or part of a structure is within preset limits or thresholds, or has exceeded them.

In another embodiment, the present invention utilizes several sensor modules and master stations for various structures owned, controlled or used by a business concern so as to provide monitoring of several or all of such structures, such as, by way of example, all of the bridges used by a railway concern.

VI. BRIEF DESCRIPTION OF THE DRAWINGS

Figure 4:
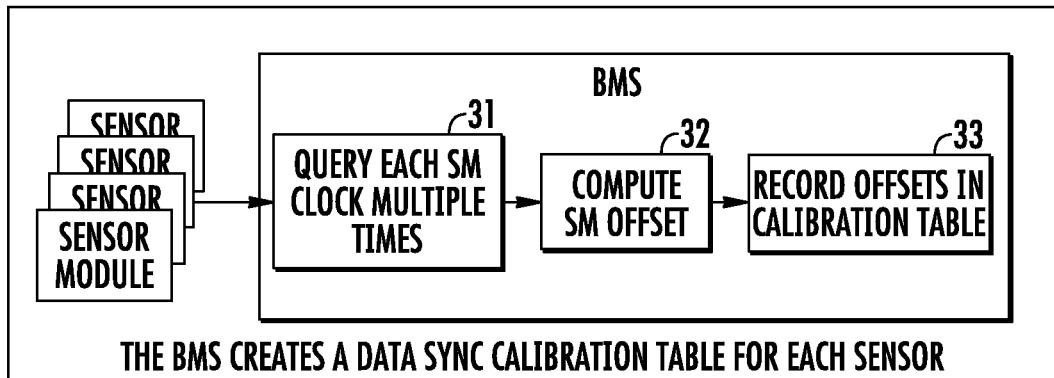

FIG. 4 sets forth a high level view of a method for synchronizing data based on the creation of a calibration table of the system of the present invention.

Figure 5:
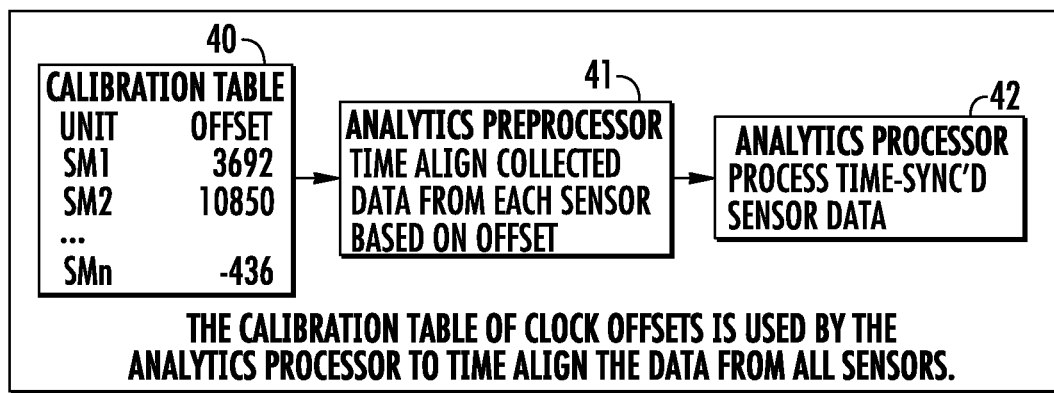

FIG. 5 sets forth a high level view of the use of the calibration table of FIG. 4 to transmit offset data to the analytics preprocessor of the present invention.

Figure 6:
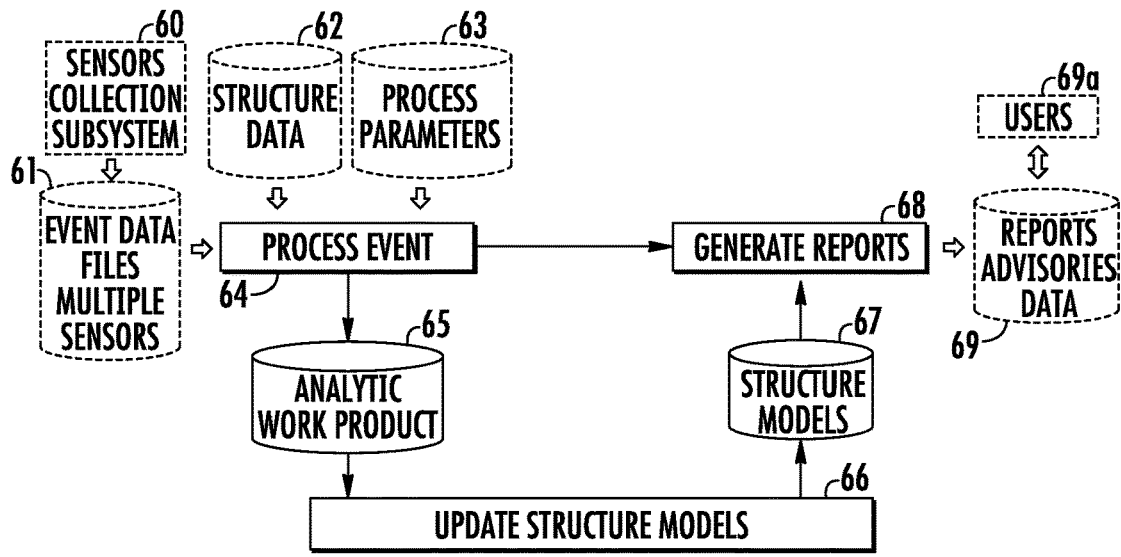

FIG. 6 is a top level algorithmic or logic diagram of the system processes of the invention.

Figure 7:
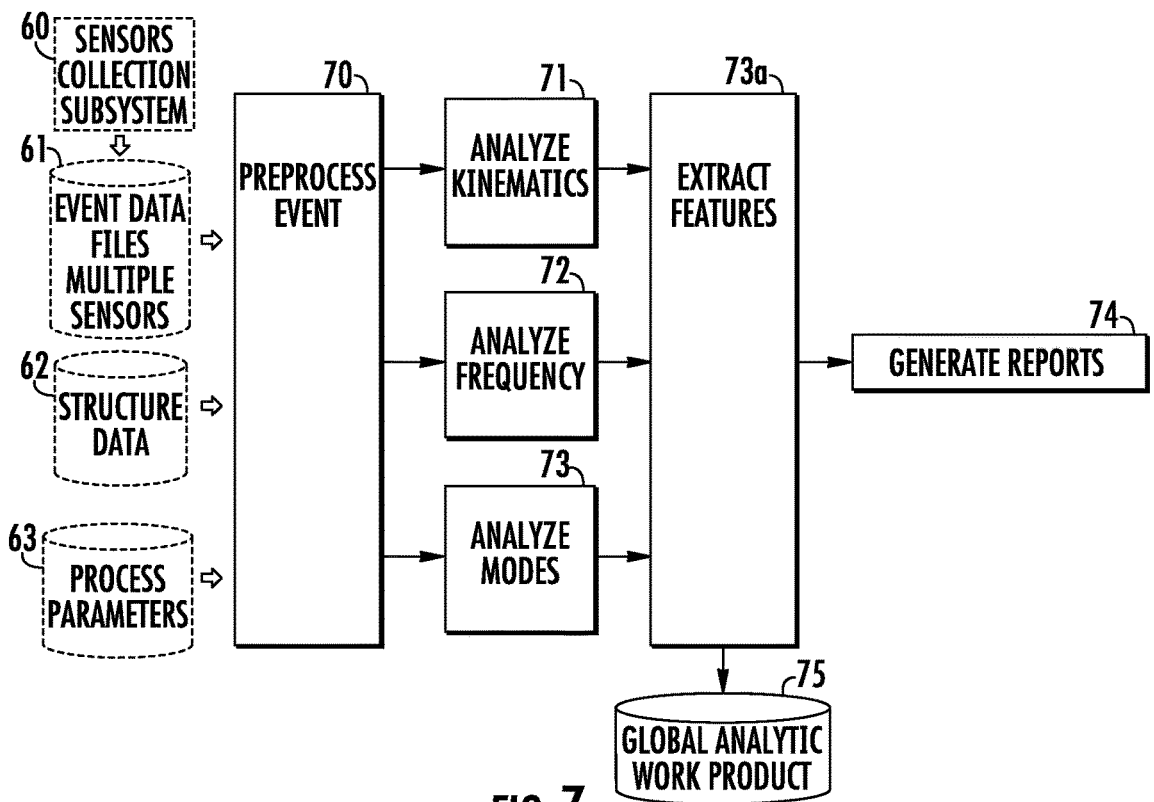

FIG. 7 sets forth a preprocess event algorithmic or logic diagram of the system of the invention.

FIG. 7A sets forth further detail of the preprocess event algorithmic or logic diagram of the system of the invention.

FIG. 7B sets forth system calculation methods of the kinematic quantities for the system of the invention.

FIG. 7C sets forth an example of the methods for frequency analysis the system of the invention.

FIG. 7D sets forth an example of the methods for the analysis of modes for the system of the invention.

FIG. 7E sets forth an example of the feature extraction methods for the system of the invention.

Figure 8:
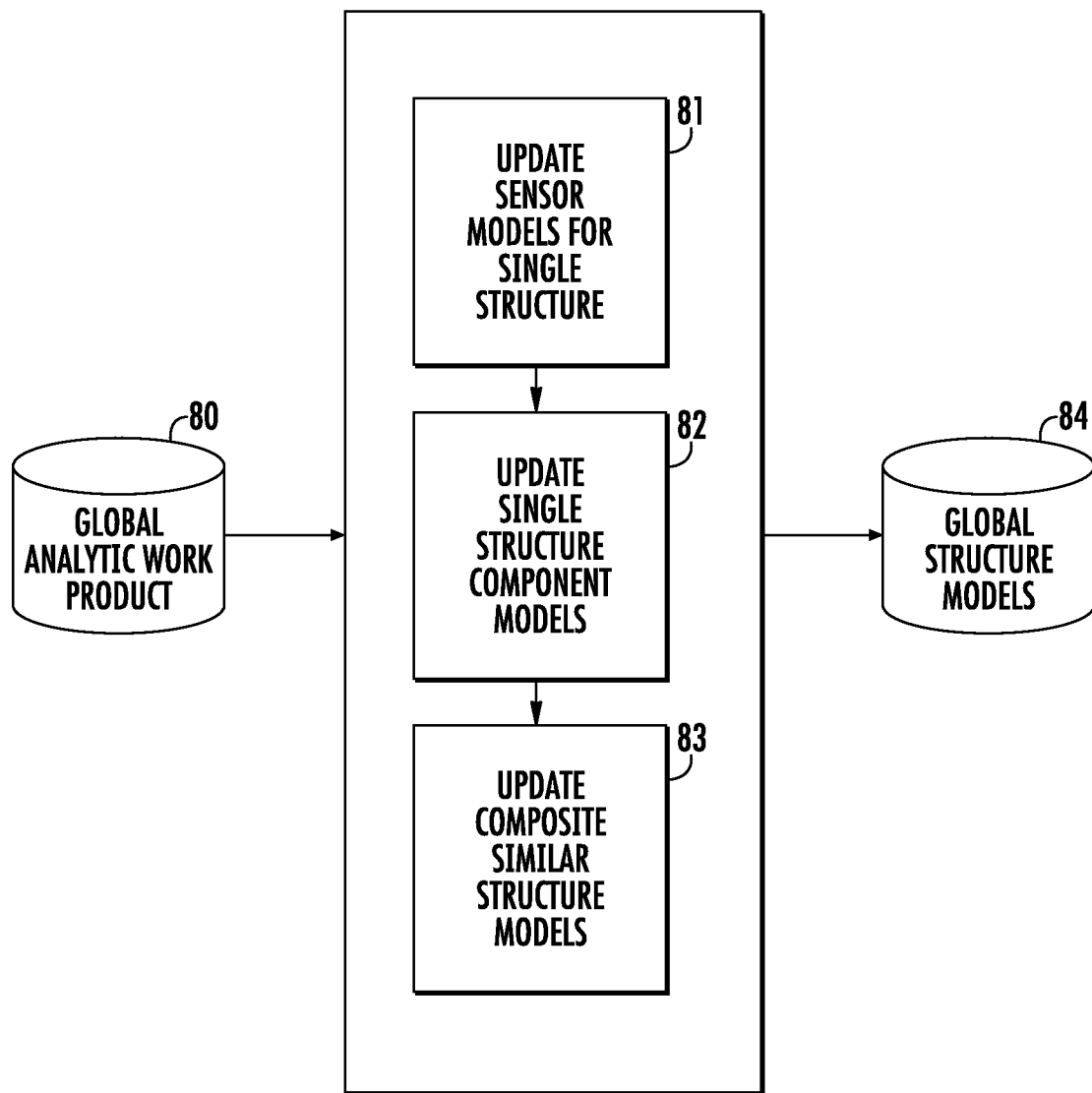

FIG. 8 sets forth an algorithmic diagram detailing the updating of a structure model of the system of the invention.

Figure 9:
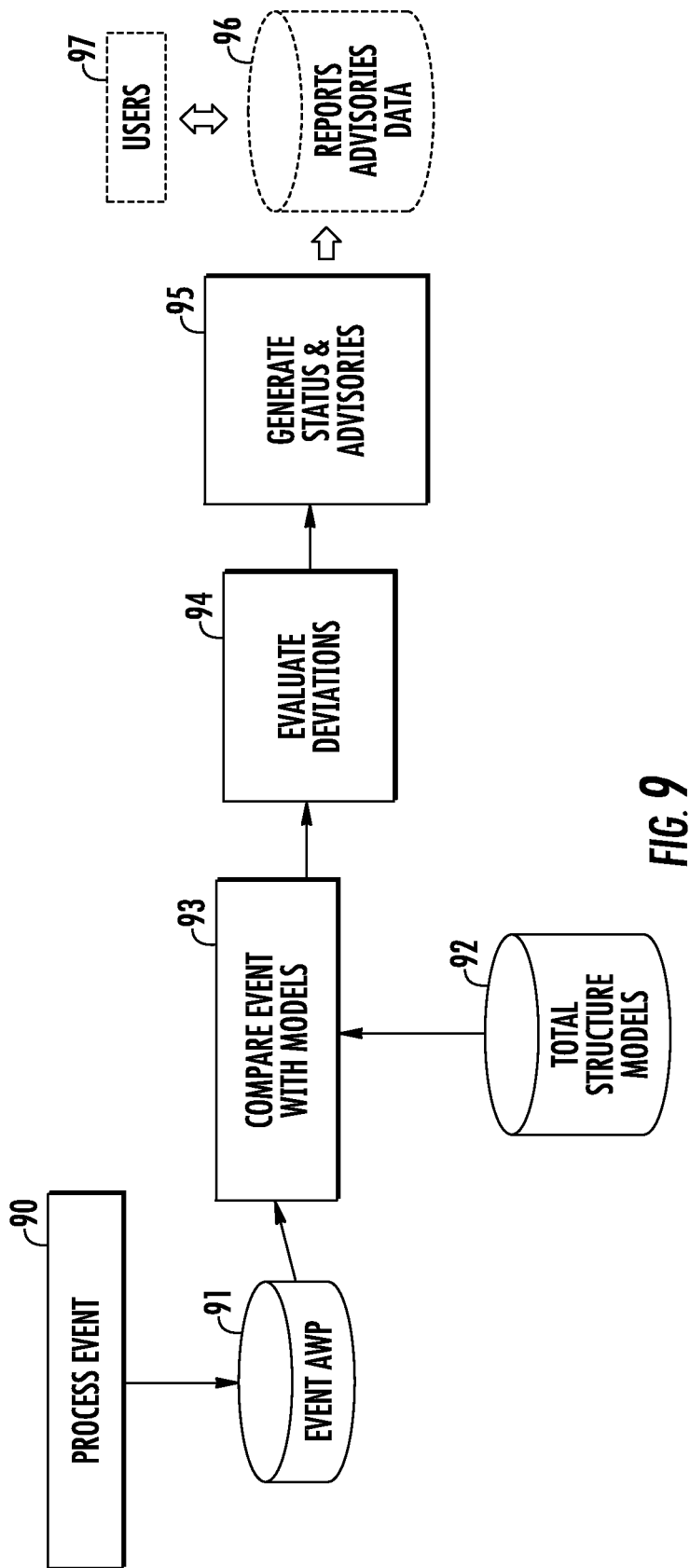

FIG. 9 sets forth an algorithmic diagram detailing the report generation feature of the present invention.

VII. DETAILED DESCRIPTION OF THE INVENTION

Utilities, Applications and Advantages of the Present Invention

The utilities and applications of the present invention, as set forth above and more fully below, are to provide powerful tools to owners and operators of structures, as well as human inspectors, engineers, architects and other professionals, who are responsible for diagnosing a structure's damage or anomaly, or who are charged with monitoring the physical status, or change in physical status, of a structure before, during or after a traumatic or significant event, while the structure is under stasis, or live or dead load, or during given time periods.

The present inventors have invented a structural health monitoring ("SHM") system, suitable for use on a wide variety of structures including rail and highway bridges, dams, levees, retaining walls, tunnels, and buildings. The present invention solves and addresses a variety of problems associated with structures. For example, for purposes of strategic asset inventory management, the invention enables a triage of structures for their placement in certain categories, for example: (1) whether the structure requires near term replacement or whether it is economically preferable to replace the structure, (2) a structure with long term good health or (3) the degree of urgency and priority as to a structure's required repair or replacement.

As presently envisioned, the instant invention alone does not constitute a "safety system" (which requires stringent performance and reliability certifications) nor a replacement for existing human structural inspectors. The invention described herein is meant to assist human inspectors by providing objective and timely observations which both complement and supplement the currently subjective and typically periodic methods based largely on visual examination of a structure. Nevertheless, the present invention achieves, among other things, the monitoring of a structure's health over time in order to assist with ongoing inspection and maintenance through the structure's lifecycle, and rapid reassessment of the structure's integrity and safety during an atypical event such as rapid scour, collision, derailment, or earthquake.

The structural features and applications addressed by the present invention include, by way of example, substructures and foundations, including substructure conditions, foundation conditions, the effects of scour; retaining walls; tunnels; steel bridges, including plate girders, truss, and fracture critical bridges; concrete bridges; stone and masonry bridges, and timber bridges.

The devices, methods and systems of the present invention provide useful resultant outputs that reflect real world aspects of the conditions of a structure in cases of both dynamic (live load) and ambient (dead load) excitation. For example, in an embodiment, the present invention provides reports of changes in the structure's behavior, and where possible, the rate of change, and when done at an early stage regarding an event, enables timely and economical remedial action. Further, an embodiment of the present invention provides reports of anomalous, inconsistent, or asymmetric behavior of the structure under consideration. In further embodiments, the present invention provides timely status reports and alerts of changes or lack of structural changes in connection with atypical events such as flooding, a train derailment, a collision, or an earthquake; the nature of observed changes in structure, and the localization of changes or anomalous, inconsistent, or asymmetric behavior of the structure. In a still further embodiment of the present invention there is provided the detection and quantification of differences in modulus between a bridge and its approaches, or between adjacent spans on the same bridge. The present invention further measures and produces observations useful in improving the accuracy of bridge capacity (based on load and speed) ratings, as well as measures and provides observations useful in improving the accuracy of estimated bridge structural fatigue. Further, embodiments of the present invention provide the detection and reporting of fire on the structure, and further provide record keeping in accordance with Federal Railroad Administration (FRA) regulations.

The devices, methods and systems of the present invention also provide detection and analysis of a range of behaviors associated with situations surrounding events that damage a structure. For example, an embodiment of the invention detects: differences in response to (1) situation events between different but similar portions of a structure to the same event, (2) situation events in the same portion of a structure during different events under similar conditions. Also, to a limited degree, the present invention can sometimes report responses that may in and of themselves indicate problems within a structure, but in all cases, follow-up by a structural inspector or structural engineer is required to complete a diagnosis and to prescribe structural remedies.

Damage to structures may result from gradual deterioration or other long term harm to a structure, or from a specific, traumatic event that may impact the structure suddenly or over a relatively short time period. For long term structural effects, the present invention may be scheduled to take periodic measurements to assess changes in a structure over time. For example, in an embodiment, the system of instant invention may be programmed to take measurements of certain events, such as a train's passage over a railroad bridge. With respect to sudden or short term damage, the system of the present invention may be programmed to take measurements of certain unanticipated events—such as a barge strike on a bridge pier, an earthquake, etc.—by setting a particular threshold on a sensor. In the case of the accelerometers, which remain powered even when the system is in a quiescent power-saving mode, the occurrence of such an event creates an "over-threshold" sensor reading which activates the system.

The present invention addresses the problem wherein some structures are at higher risk of damage by scour, which is of particular concern during floods or other unusual water-flows. In these cases, an embodiment of the invention can include wired sensor modules on piers and abutments, which can remain powered for long periods and can also function underwater.

Traumatic events may or may not result in serious damage to the structure, but often there is a need to quickly determine if emergency action is required. The present invention provides structural detection and analytics to inspectors, structural engineers or first responders in order to make causal and other determinations. In an embodiment of the system of the present invention, sensor modules can be set with certain activation thresholds. Thus, if an over-threshold sensor reading results in sensor module activation in time to collect data from the event itself, then this data can be analyzed by the analytic programs described herein. Further, in the event that that data from the structural event is only available from those sensor modules most effected, an over-threshold reading on one sensor module can result in all the sensor modules performing a collection cycle, perhaps with a delay of a few seconds in sensor module initiation. Further, if data from the actual event is unavailable, the structural status can still be inferred from data collected by the system of the present invention after the fact, both in dead load and live load situations. Depending on the degree of prospective structural damage, this may be an iterative process. For example, dead load data is first examined. If this examination does not indicate significant changes to a structure, then additional data can be measured and collected under live load conditions, perhaps by incrementally increasing the weight and speed of traffic that may be associated with the load conditions.

The utilities of the present invention are also economic in nature. For example, the present invention is affordable enough in that it aids in providing favorable returns on investment and cost of ownership when applied to bridges in large numbers. Pertinent economic factors include:

A. A low initial acquisition cost of the system and devices of the instant invention for use in each bridge utilizing the invention.

B. There is a relatively small amount preparatory work such as structural analysis and reverse engineering of the target structure which utilizes the present invention. This largely rules out conventional approaches which often involve development and validation of a finite element model.

C. Wireless sensor modules used as part of the present invention can be quickly and economically installed on an existing structure. In most cases system installation encompasses:
  1. Site survey and determination of the number and the appropriate locations of sensor modules;
  2. Application of the sensors to the structure using a spirit or bubble level to determine whether the sensor is level and to approximately align the sensor modules to vertical direction of gravity;
  3. Recording of the sensor modules' locations relative to each other and key points on the structure in a three dimensional ("3D") grid system. The most likely way to determine these positions is by using Carrier-Phase Enhancement GPS ("CPGPS");

4. In an embodiment, the system of present invention, is self-calibrating and uses, under dead load conditions, the measured direction of gravity to calibrate the accelerometers, uses the local direction of the magnetic field to calibrate the magnetometers, and uses measured angular rates to calibrate the gyroscopes;

5. System configuration and initialization includes establishing LAN links to all sensors by the master station and setting the sensor operational parameters e.g., collection duration, and 6. Baselining of the structure's performance in response to both dynamic (live load) and ambient (dead load) inputs.

D. The devices and systems of the present invention allow for minimal maintenance after installation and during service life. A factor is sensor module battery longevity.

The devices and systems of the present invention allow for minimal or no requirement for connectivity from bridge sites to other locations such as a control center. The "value added" of the devices and systems of the present invention may vary considerably depending on the specific structure and its circumstances. Among bridges, for example, bridges with differing characteristics and economic considerations are:

A. Bridges or other structures which might be termed "monumental" are generally considered to be too expensive to replace, therefore effective ongoing maintenance by the present invention may be crucial. It can be very difficult and dangerous for inspectors to complete inspections on such large structures. For example, there are about 600 such rail bridges in North America and many more highway bridges.

B. Fracture critical bridges are bridges having the unfortunate design characteristic of interdependency and non-redundancy that lead to catastrophic failure if any one of a number of critical elements fails. While far less common on railroads compared to highways, some railroad bridges are termed "non-redundant" and can be considered fracture critical.

C. Scour critical bridges are situated in such a way that they are likely to suffer erosion and undermining by water flow of abutments or foundations. Such bridges may experience considerably heightened risk during periods of floods or flash floods. The period of higher risk may last for days.

D. Bridges which might be termed "troublesome" are known to be at greater risk of rapidly changing structural status and therefore require far more frequent inspections that a stable bridge which would normally be inspected only once a year. The devices and systems of the present invention can reduce the frequency of human inspections while increasing the overall level and timeliness of structural status knowledge.

E. Bridges which have been nominated for replacement due to their perceived structural condition may in fact have either localized repairable deterioration or may simply appear to be in worse condition than is true. The objective measurements of the devices and systems of the present invention can help verify or negate judgments based on visual observation.

F. Many bridges are chokepoints on heavily travelled rail lines because they have restrictive speed limits (slow orders) imposed to prevent damage and to limit wear and tear. These are generally set by highly conservative estimation methodologies. Improving the accuracy of these estimations by objective measurements of the devices and systems of the present invention can be very helpful in reducing traffic flow restrictions.

G. The maximum allowable weight of freight cars has been increasing. When an increased weight limit is contemplated or authorized, each bridge must either be assessed and certified for the higher capacity (sometimes with a corresponding reduction in speed) or that the rail line is relegated to a lesser status than the rail network as a whole. Adding objective measurements by use of the devices and systems of the present invention into the assessment process can improve outcomes, especially for bridges whose original documentation is unavailable.

Further Description and Features of the Devices, Systems and Methods of the Invention The structural health monitoring methods and devices of the present invention are described and enabled as set forth above, and in further detail below.

In one embodiment, the invention is comprised of sensors and sensor modules mounted, attached to, or near to, one or more parts or regions of a structure for detecting physical or related phenomena associated with the structure before, during and after a load or other event impacting or otherwise affecting the structure. The sensor modules measure and convert the detected phenomena into digital data and transmit the data to a master station for data compilation, storage and analysis.

Figure 1:
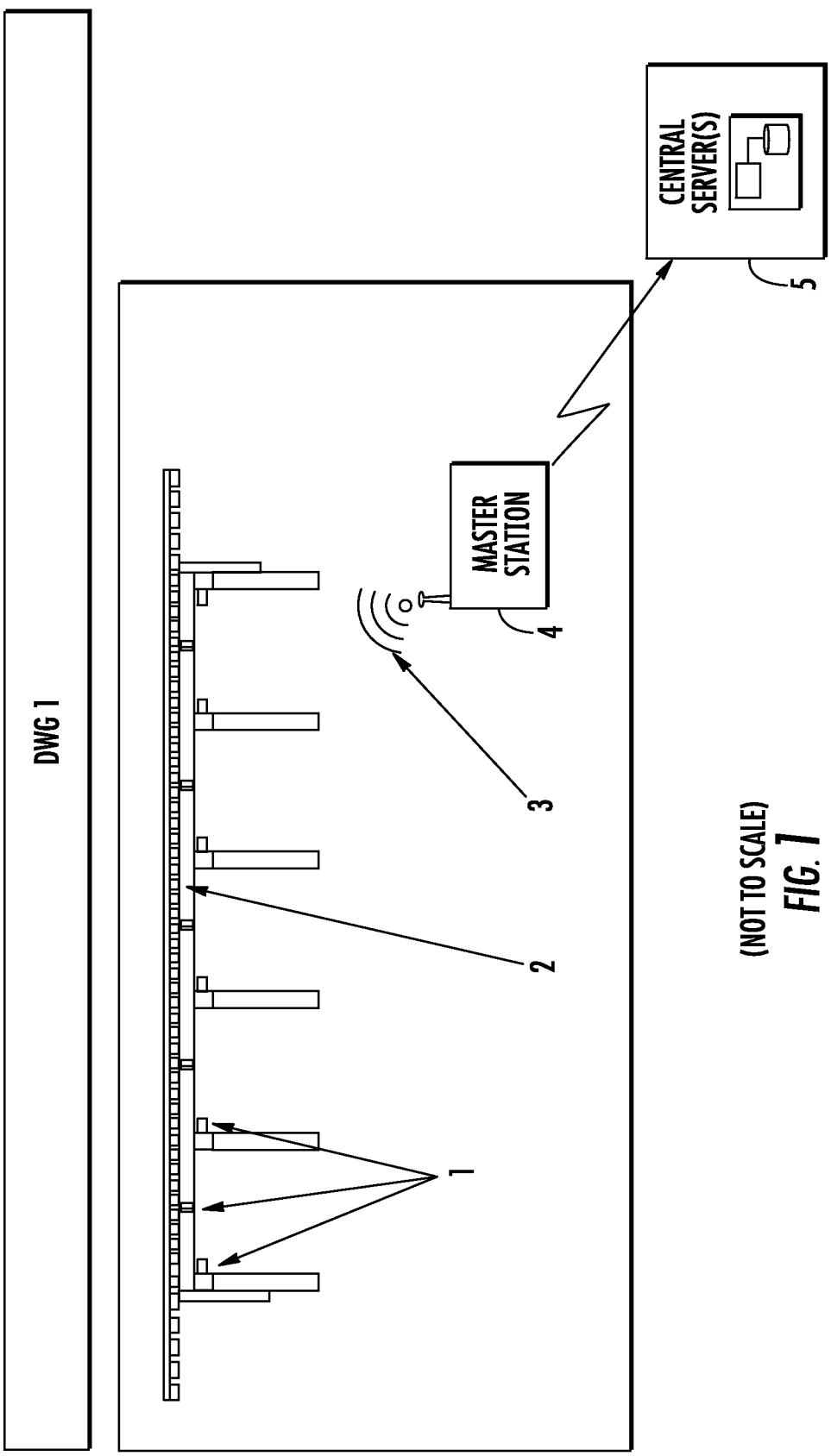
FIG. 1 is depiction of a bridge structure together with the sensor modules, communication links, master station and servers within the present invention.

As exemplified in FIG. 1, sensors modules 1, are attached to bridge structure 2 for detecting physical or related phenomena associated with the structure. The sensor modules read and convert the detected phenomena into digital data and transmit the data over a WIFI network 3, such as a local area network ("LAN") or wide area network ("WAN") to a master station 4 for data compilation, storage and analysis. In an embodiment, data can also be transmitted over local data hub(s) ("LDH") FIG. 2, 14. Further, in an embodiment, one or more master stations may transmit data and information to one or more central servers FIG. 1, 5.

Figure 2:
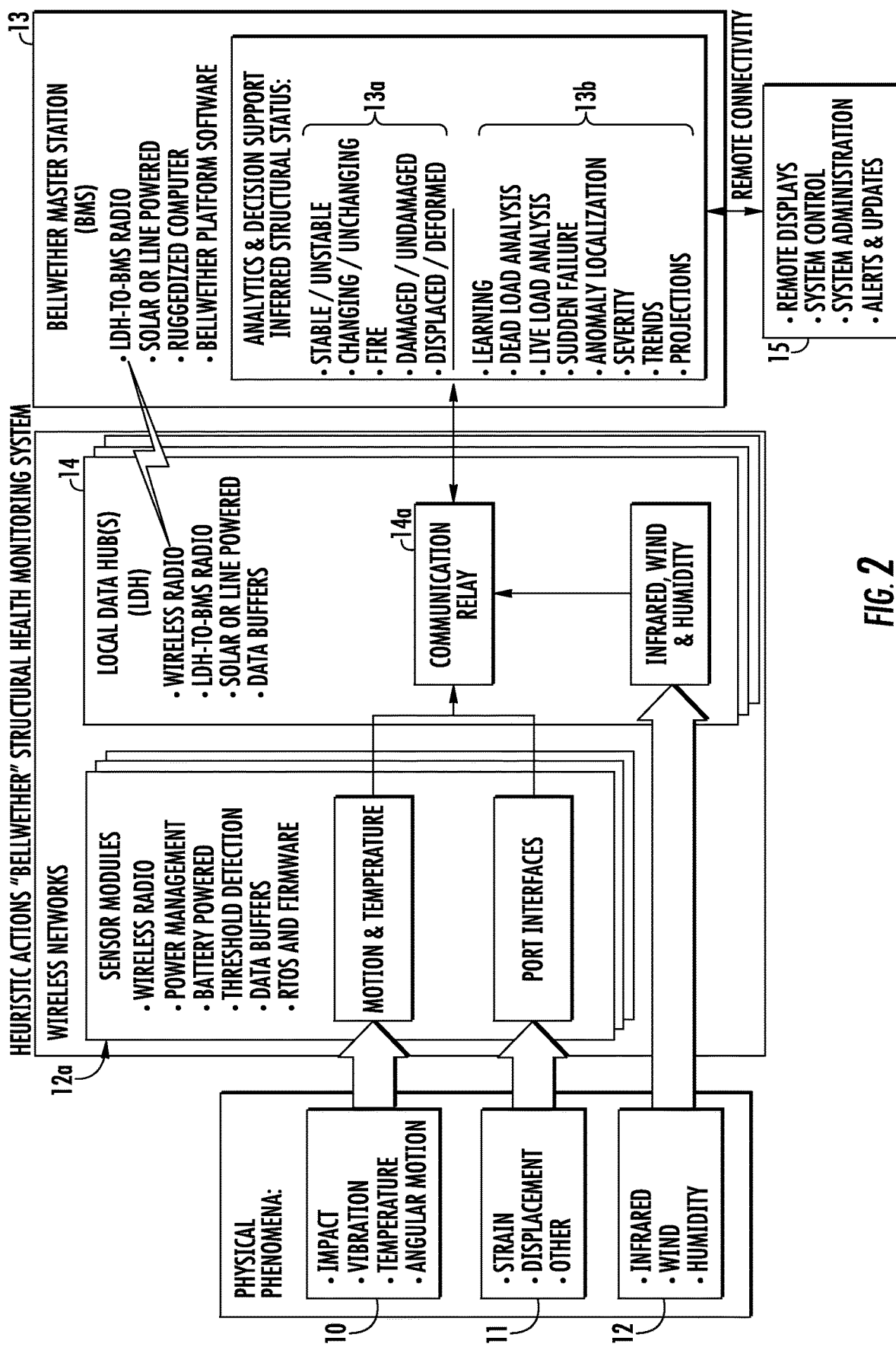
FIG. 2 depicts a high level view plan of the main components of the instant invention.

FIG. 2 depicts a high level view plan of the main components of the instant invention. As shown in FIG. 2, various physical phenomena associated with a structure, for example, impact, vibration, temperature and angular motion 10, strain and displacement 11, heat, wind and humidity 12, is read by the sensor modules FIG. 1,1 and FIG. 2, 12a and converted into data. As stated above, in one embodiment, the sensor modules send the data over wireless communications transmissions via a wireless networks directly to the master station FIG. 2, 13. In another embodiment, sensed data is relayed from the sensor modules 12a via LDH(s) 14 and 14a to the master station 13 for processing or analysis based on programmed algorithms, which generate analytic work product, including the inferred status of the structure that is calculated and generated 13a. Such work product includes the stability of the structure, structural changes, fire, structural damage, displacement or deformation of the structure 13a. In addition, the master station is configured with programmed algorithms that perform, with respect to the structure, structure modeling and model updating, and with respect to changes in a structure and structural monitoring, machine or system learning calculations and updating, structural trends and projections, structural dead load analysis and live load analysis, structural failures, structural anomalies and anomaly localization, and the degree of the severity of events and structural phenomena. 13b. In one embodiment, the master station is connected remotely to other devices, such as central server(s) wherein analytic work product generated by the master station can be accessed and displayed. 15.

The aforementioned components and features of the present invention are described in more detail below.

Sensors

The term "sensor(s)," as used in this patent specification is used as that term would be understood by those of ordinary skill in the art. For example, one definition of a "sensor" refers to an object or device whose purpose is to detect events or changes in its environment, and then provide a corresponding output. A sensor can be sometimes understood as a type of, or employing, a transducer, and can provide various types of output, such as electrical or optical signals. See, for example, https://en.wikipedia.org/wiki/Sensor. (Last visited May 29, 2016). The output signals of sensors can be digital or analog. Id. The foregoing reference is incorporated by reference herein and as if fully set forth herein.

Sensors used in connection with present invention comprise accelerometers, gyroscopic sensors, magnetometers, wind sensors, infrared sensors, humidity sensors, or other sensors known to those of ordinary skill in the art in the inventors' field of endeavor.

In an embodiment of the present invention accelerometers are of significant use. The term "accelerometer(s)," as used in this specification is that which would be understood by one of ordinary skill in the art. In a general sense, an accelerometer is a device that measures acceleration including gravitational acceleration. Accelerometers used in connection with the present invention measure the motion and vibration of a structure that is subject to load. The term "load" as used in the context of the present invention includes live and dead loads. Loads placed on a structure can come from a variety of sources including, but not limited to, human activities, machines, construction work, demolition, drilling and excavating, moving loads, such as those placed on railways, roads and bridges, etc., collisions, impacts, concussion loads, collapses, wind and wind gusts, pressure, support loss, ground failure, deterioration, wear, scour, erosion, breaks in structure or structure connection, fire, flooding, water-flow, drift, and earthquakes and aftershocks, etc. In the field of structural health monitoring, measuring and recording how a structure dynamically responds to these conditions can be highly important, or even critical, for assessing the safety and viability of a structure.

In an embodiment of the present invention gyroscopic sensor(s) are also used. The term "gyroscopic sensor(s)," as used in this specification is that which would be understood by one of ordinary skill in the art. In general, gyroscopic sensor is a device that measures the angular rotational velocity of a structure.

In an embodiment of the present invention magnetometers are used. The term "magnetometers," as used in this specification is that which would be understood by one of ordinary skill in the art. In general, magnetometers measure the earth's magnetic field and other magnetic fields such as from magnetic structures and electrical devices, and have the capability to measure the tilt of a structure with respect to gravity. See, e.g., STRUCTURAL HEALTH MONITORING 2003, *From Diagnostics & Prognostics To Structural Health Management*, Fu-Kuo Chang, DES Publications, Inc., p. 103 et passim. The foregoing reference is incorporated by reference herein and as if fully set forth herein.

In an embodiment of the present invention infrared temperature sensors are used. The term "infrared sensor(s)," as used in this specification is that which would be understood by one of ordinary skill in the art. In general, infrared sensors sense electromagnetic waves in the 700 nm to 14,000 nm range. These sensors work by focusing the infrared energy emitted by an object onto one or more photodetectors that convert that energy into an electrical signal, which is proportional to the infrared energy emitted by the object. Because the emitted infrared energy of any object is proportional to its temperature, the electrical signal provides an accurate reading of the temperature of the object that it is measuring.

In an embodiment of the present invention wind sensors are also used. The term "wind sensor(s)," as used in this specification is that which would be understood by one of ordinary skill in the art—for example, an anemometer.

In an embodiment of the invention, humidity of the air mass surrounding the structure is measured. The methods used to measure the humidity in the air mass near or around a structure would be readily understood by one of ordinary skill in the art. By way of example, a hygrometer is used to sense the humidity near a structure in accordance with the present invention.

Sensor Modules

As discussed, the system architecture of the present invention comprises multiple sensor modules which provide sensor measurement information to the master station. Preferably, the sensor modules are battery powered, and account for ease and economy of installation. Preferably, the batteries should last on the order of 5-10 years under normal conditions. Further, it is preferred that the sensor modules have a low duty cycle in order to conserve battery power. In an embodiment of the invention, battery-powered sensor modules remain in a quiescent state except when performing specific functions such as sensing and communicating. In one embodiment, while the sensor modules are in a quiescent state, only real time clock ("RTC"), accelerometers, and limited radio functions remain powered. A sensor module may be awakened by the RTC at a preset time. The accelerometer will awaken the sensor module if it senses values above a preset threshold, at which time the sensor module establishes a connection with the master station, which then sends a general wake-up command to all other sensor modules.

Figure 3:
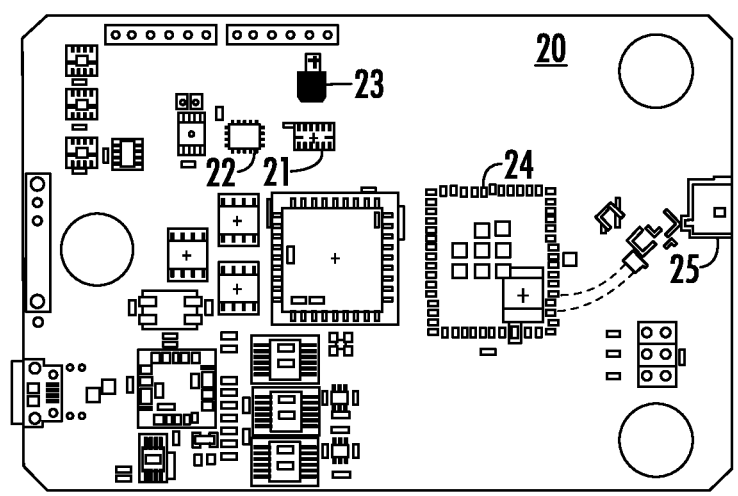
FIG. 3 is a copy of enlarged digital photograph of a sensor module exemplar constructed and used in connection with the present invention.

FIG. 3, is a depiction of a sensor module exemplar constructed and used in connection with the present invention. As shown, the sensor module comprises a printed circuit board ("PCB") 20. Mounted or soldered on the PCB is a series of sensors including a 3 axis accelerometer 21, a 3 axis gyroscopic sensor 22, a 3 axis magnetometer 23 and a wireless radio/MCU 24, and an antenna 25, amongst other components Sensor Architecture As described above, the present invention, in one embodiment thereof, utilizes the application of multiple sensors across the structure. For illustrative purposes, the structure in this embodiment is a railway bridge as shown in FIG. 1 (not drawn to scale). However, the complexity and architecture of the structure is a factor to be assessed with respect to the number and placement of sensor modules employed as would be understood by one of ordinary skill in the art. For example, more complex structures may require more sensor modules while simpler structures might require fewer modules, as would those of ordinary skill in the art would recognize upon the reading of the present specification.

The use of numerous sensor modules allow for better location of damage to a structure, and provide backup in the case of a particular sensor module malfunction or failure. In addition, in some cases, multi-sensor measurements may be needed to identify, or optimize the identification of, phenomena not otherwise discernible with a single sensor module.

In a preferred embodiment of the present invention, 3-axis accelerometers are the primary sensor type used, as well as the use of 3-axis gyroscopes and 3-axis magnetometers, amongst other devices, so as to provide three dimensional sensing. Transmission frequencies of interest are generally low. For example, the input from trains in live load structure situations has been found to be on the order of 100 Hz. Railroad bridge natural frequencies are around 0.5-1.5 HZ. In some cases, super-harmonics on the order of 2000 Hz will be of interest. Preferably, live load sampling will be of 16 g maximum amplitude and 12-14 bit granularity, and dead load sampling of ambient inputs will be less than 1 g and may require 16 bits.

In an embodiment, each sensor module used can be capable of temperature sensing. However, since humidity is a global variable, it can be sensed at as few as one or two locations on the structure. Wind is a more global variable and can be sensed at one or a few locations depending on the length and situation of a structure, such as a bridge. With respect to fires, infrared sensing and detection thereof is highly recommended.

The following discussion and Table 1 presents six examples of various types of specific damaging events to a structure, and the data, measurements and analyses that the present invention provides:

Broken structural member or connection: Over a structure's lifespan, deterioration due to corrosion or wear can result in a loss of structural performance, for example, a member breaks or a connection point loses stiffness. This deterioration might manifest itself under both dead load and live load, or only during live load. The onset may be gradual or sudden.

Scour and erosion: Scour and erosion result from waterflow removing soil and rock from around the foundations of the structure. If this proceeds too far, the foundations will be weakened or destroyed with serious negative impact on the structure. Scour and erosion can reach and exceed a critical point very rapidly, particularly during flood conditions. Exacerbating the situation, flood waters are often murky, making it difficult or impossible to visually evaluate damage around submerged foundations.

Collisions, such as a vehicle or barge strike, or a derailment on a bridge: Bridges spanning waterways and motorways are subject to damage from watercraft or motor vehicles striking the structure. In extreme cases, a span may be knocked partially or completely off of its supports, or the entire structure may collapse. In many cases the collision goes unreported so damage may not be suspected.

Earthquakes and severe weather: Seismic events or severe weather can cause damage to foundations, supports, or knock spans completely off of their supports. The entire structure may collapse. A common difficulty with conventional inspection practices is that operations may need to be suspended until all bridges in the geographic area have been inspected and cleared for use. The present invention can report the structural status of each bridge immediately and thereby assist in prioritizing inspections and much more timely restoration of operations.

Fire: Fires on bridges are not uncommon and often do not result in damage severe enough to warrant repair. Even a fire extensive enough to thoroughly char a timber bridge may not reduce the structural members' cross section enough to weaken it substantially. The present invention provides valuable assistance in quickly determining the extent of damage. While the heat from a fire is likely to damage sensor modules attached to the bridge, they can quickly be replaced. In addition, the master station, which is usually located off the bridge, contains the analytic records. This enables the system of the present invention to continue monitoring as soon as the new sensor modules are in place.

Flooding and drift accumulation: High water and high flowing water are a fact of life in many areas. In addition to the effects of scour and erosion, flooding can result in damage to bridges due to lateral pressure exerted on the structure by flowing water and by debris striking the bridge. Additionally, the accumulation of debris, including trees and foliage, can reduce the cross section available for water flow, leading to both higher water and increased lateral pressure.

The devices and systems of the present invention sense and process phenomena such as that which is summarized in Table 1 below. Table 1 correlates the type of damage to a structure, as listed in Column A, with phenomena measured by the various sensors used by the present invention as identified at the top of each of the Columns B, C, D, E and F.

TABLE 1

| A | B<br>Accelerometer | C<br>Gyroscope | D<br>Wind Sensor | E<br>Infrared | F<br>Magnetometer |
| --- | --- | --- | --- | --- | --- |
| Broken structural member or connection | Changes in static tilt<br>Changes in live load kinematics<br>Changes in dead load responses to ambient inputs | Changes in rotational behavior under live load<br>Motion while tipping over | Wind readings taken into account | | Tilt measurement |
| Scour and erosion | Changes in static tilt<br>Changes in live load kinematics<br>Changes in dead load responses to ambient inputs | Changes in rotational behavior under live load<br>Motion while tipping over | Wind readings taken into account | | Tilt measurement |
| Collision | Sharp impact of collision<br>Distinctive pattern if SM collects data while still in progress?<br>Changes in static tilt<br>Changes in live load kinematics<br>Changes in dead load responses to ambient inputs | Changes in rotational behavior under live load<br>Motion while tipping over | Wind readings taken into account | | Tilt measurement |

TABLE 1-continued

| A | B<br>Accelerometer | C<br>Gyroscope | D<br>Wind Sensor | E<br>Infrared | F<br>Magnetometer |
|---|---|---|---|---|---|
| Earthquake | Seismic motion<br>Distinctive pattern if SM collects data while still in progress?<br>Changes in static tilt<br>Changes in live load kinematics<br>Changes in dead load responses to ambient inputs | Changes in rotational behavior under live load<br>Motion while tipping over | Wind readings taken into account | | Tilt measurement |
| High wind | Wind-induced motion<br>Changes in static and dynamic tilt<br>Changes in live load kinematics<br>Changes in dead load responses to ambient inputs | Motion while tipping over | Wind readings | | |
| Fire | Post fire:<br>Changes in static tilt<br>Changes in live load kinematics<br>Changes in dead load responses to ambient inputs | Post fire:<br>Changes in rotational behavior under live load | | During fire:<br>Detection of high heat by BMS-mounted IR sensor | |
| Flooding and drift accumulation | Water-induced motion<br>Changes in static and dynamic tilt<br>Changes in live load kinematics<br>Changes in dead load responses to ambient inputs | Changes in rotational behavior under live load<br>Motion while tipping over | Wind readings taken into account | | |

Master Station

The sensor or sensor modules communicate with, and provide measurement information to master station FIGS. 1, 4; FIGS. 2, 13

As set forth below, the master station is comprised of a specialized computer, or a computing system, that is solar or line powered. This platform is ruggedized and provides protection from environmental and situational hazards such as weather, high water, electromagnetic interference, etc. A Logic Supply DS-1001-g8gc may serve as a basic computing device upon which the master station may be constructed and configured. Preferably, the master station is not mounted directly on the structure to be assessed lest it be destroyed if the structure burns or collapses.

In an embodiment of the present invention, the master station is configured or programmed to control and communicate with the sensor modules, including by receiving data from the sensor modules and sending instructions to them, as discussed herein. In addition, the master station is configured and programed to perform the tasks and analytics, and to generate the analytic work product and reports, on a subject structure as described herein. The master station comprises, among other components and functions, one or more central processing units (CPUs), operating systems and applications software, firmware, data processing, memory, data structures, input and output means, connections and connectivities to other computing devices and networks, such the Internet, VPNs and LANs, and other public, proprietary or secured networks, displays, peripherals such as interfaces, keyboards, mouse, microphones, speakers, cameras, printers and the like.

As described above, in an embodiment of the present invention, data detected or read by the sensor modules is transmitted to the master station over local area networks ("LAN"), and, more preferably, over wireless networks utilizing wireless radio transmission. As hereinafter described, the information detected by the sensors may be passed directly from the sensor modules to the master station, or may be first routed or relayed through one or more intermediate links, such as local data hubs ("LDH"), to the master station. FIG. 2, 14, 14a. In a preferred embodiment, LDH firmware will manage the internal operations and connections of the communications systems of the present invention.

The software employed in the present invention comprises firmware, system software, and analytic software. In a preferred embodiment, custom firmware is provided that manages the internal operations, quiescence, and connectivity of the sensor modules, master station, and other components of the invention. In addition, the LDH firmware manages the internal operations and connectivity of the master station or other components.

The master station performs analytics based on the data received from the sensor modules. The analytics are carried out in accordance with various algorithms embodied in software code.

Links and Communications

Preferably the sensor modules are connected to the master station via a wireless local network. However, in other embodiments intermediate links are used. The wireless architecture of the present invention simplifies system installation and eliminates ongoing risk of damage to cables. Low power wireless links are available to transfer raw data from the sensor modules with acceptable power usage and throughput. The inventors herein have found that simple star-topologies are generally effective and more power frugal than mesh networks for communications with units at fixed locations.

In other embodiments, there may be conditions where the communications paths from the sensor may be challenging, and a relay point are found to be useful. For example, some structures—bridges and tunnels, for example—are miles in length, which may be longer than the range of a specific wireless technology. If intermediate links are required, the architecture may include special communications nodes, such as LDHs. In an embodiment, LDHs gather information from the sensor modules in a subset(s) of the structure, e.g., a bridge, and then relay it to the master station via other LDHs or directly to the master station. As another example, if a bridge is very long, it is may be advisable to divide it into two separate installations with a master station at each end.

LDHs may also be used to host the sensing of more global phenomena such as humidity and wind. LDHs can be solar or line powered to enable continuous operation and eliminate other power management concerns. In some cases it may be necessary to use a variant of the sensor module that connects to the system of the invention by wire to obtain power and pass information. This will enable continuous operation for longer periods of time. It will also enable operation in high water situations when the sensor module may be submerged and the wireless links are unusable. The local LDH can also may be a convenient point to terminate the wired connection from the sensor module. Wired communications are sometimes needed in whole or in part where wireless communication is not feasible under given conditions, and would still be within the scope of the present invention as would be understood by one of ordinary skill in the art.

Further, with respect to the analytic functions, in an embodiment of the present invention, analysis of measured data is conducted onsite, with analytic results available at the master station. It is simple and effective to host all of the analytic functions on the master station. However, in other embodiments, raw data or intermediate analytic product can be transmitted from the master station to other points, such as a central server via an external connection. External communications are provided by interfaces at the master station and can include interfacing to telephone, cellular data, satellite, WIFI, radio, and other systems for offsite connectivity.

Analytic Methods, Processing and Work Product

The present invention further comprises the combination of sensors, sensor modules, master station and additional server(s) with processing, computing, algorithms and software comprising firmware, system software, and analytics and reporting and advisory features as described above and in more detail below.

The sensor modules comprise firmware that manages internal operations, quiescence, and connectivity of the systems of the present invention as discussed above. In addition, LDH firmware manages internal operations and connectivity of the parts of the system. System software in the master station provides functions and services such as administration, security, data bases, human-machine interface ("HMI"), system connectivity, and other functions respecting the transmission of data as set forth above, amongst other functions and services. The analytics that perform the structural health monitoring of the present invention are defined by various algorithms embodied in the code. In multiple embodiments of the present invention, the analytic functions can be accomplished at various points in the system.

In one or more embodiments of the present invention, data detected and measured by the sensors and sensor modules is sent to the master station for processing. In general, the master station is the location where local bridge processing is accomplished, collected data and results are stored for review, and assessments and advisory reports are generated. In another embodiment, the sensor modules conduct some processing of the detected data such as triggering and data cleansing. However, since the sensor modules are battery powered, assigning processing to other nodes will extend battery life by saving sensor module power over time. Data cleansing and triggering processing by the sensor modules utilize the processing power of the sensor module components while conserving battery power and use. The master station comprises a specialized computer together with a full service operating system, and thus has sufficient storage, computing power, operating system(s), and other resources to support complex algorithms and archiving of collected raw data and processed information, as discussed above.

FIG. 6 sets forth a top level algorithmic or logic diagram of the system processes wherein external system and subsystem collections 60 are fed into sensor module event data files 61, and wherein said sensor module data files 61, as well structure data 62 and process parameters 63, are fed into the process event module 64. The process event module can then generate reports 68 directly, or produce analytic work product 65 which is then sent to the structure module component 66 wherein the structure model data is updated and sent to the structure model module 67 which is used to generate reports 68, which, in turn, produce advisory data 69 which can be used via HMI by users 69*a* of the system who can access intermediate data, including raw data files, analytic work product and structure models.

FIG. 7 sets forth a process event algorithmic or logic diagram of the system processes wherein the event data and parameter information of the external systems and subsystems interfaces 60, 61, 62 and 63 are preprocessed 70—the preprocessing systems are set forth in detail below—and then sent to the analysis modules to determine the structure's kinematics 71, frequency 72 and mode 73. Analytic output for 71, 72 and 73 are sent to module 73*a* for feature extraction. Module 73*a* can then extract resultant features and enable the generation of reports 74 as well as global analytic work product 75.

Drilling down further into the algorithmic, system and component operations of the present invention, FIG. 7A depicts the data type and system calculations for an example of a preprocessing event, including a set up for the structure parameters, e.g., structure definition and sensor parameters, a set up for the processing parameters, loading signal data from all of the sensors for such event, e.g., extraction of header information and event data and the initialization of feature data; FIG. 7B details the system calculation methods of the kinematic quantities for each sensor and sensor module, including, for example, that relating to linear acceleration, angular velocity, orientation, linear acceleration correction using gyroscope signal data for the sensors, and synchronization of event timing across the sensors; FIG. 7C details an example of the system calculation methods for frequency analysis of a dynamic event type, including, e.g., the calculation of the parameters for impulsive and short duration signals, as well as the calculation of the parameters for long duration signals; FIG. 7D details an example of the system calculation methods for the analysis of modes for dynamic and dead-load type events, including, e.g., system calculation of basic structure modes of motion under dynamic loading, calculation of signal propagation times using time-aligned sensor data, calculation of structure tilt angles, as well as calibration of the sensors for dynamic analysis using dead load event, and FIG. 7E details the feature extraction system calculations of the invention, including calculation of static event features, kinematic features, frequency features, and a structure's modes of motion.

As described herein, the present invention creates structure models wherein the features and characteristics of a particular structure, e.g., a bridge, are used to create a composite model. As structure's health and conditions are monitored and analyzed over time, the analyzed data and analytic work product obtained is used to update the structure model which enables the user to assess how the health of the structure has changed over time. FIG. 8 sets forth an algorithmic diagram detailing the updating of a structure model wherein, in an embodiment of the invention, based upon global analytic work product 80, sensor models are updated for a structure 81, single structure component models are updated 82, and an updated composite for similar structure models are created 83. Based on these processes, the model update system produces global structure models 84.

FIG. 9 sets forth an algorithmic diagram detailing the report generation feature of the present invention. As shown, where an event is processed 90 and event analytic work product 91 is generated, the event analytic work product data 91 is compared with data from local structure models 92 to generate comparison data 93, comparison data 93 is used to evaluate the deviations based on 91, 92 and 93, as shown in the deviation evaluation component 94, which then generates relevant status and advisories and reports of same 95, 96 which are accessible by users 97.

In one or more embodiments of the present invention, the system processes, algorithms and other analytic functions are written in high level languages or platforms such as MATLAB™ or C to ease development and maintenance. MATLAB™ (matrix laboratory) is a multi-paradigm numerical computing environment and fourth-generation programming language. MATLAB allows matrix manipulations, plotting of functions and data, implementation and coding of the algorithms used herein, including those described below with respect to the systems and methods of the present invention, creation of user interfaces, and interfacing with programs written in other languages, including C, C++, C#, Java, Fortran and Python.

Although MATLAB was originally intended primarily for numerical computing, an optional toolbox uses the MuPAD™ symbolic engine, allowing access to symbolic computing abilities. An additional package, Simulink, adds graphical multi-domain simulation and model-based design for dynamic and embedded systems. See https://en.wikipedia.org/wiki/MATLAB (last visited Nov. 6, 2016).

In at least one embodiment of the present invention, the tools and features of MATLAB™ are preferred in building the analytics and software of the present invention. See, e.g., https://www.mathworks.com/products/matlab/ and is MATLAB is particular suited for and geared toward building engineering systems and functions and interfaces with other systems on built on the MATLAB™ platform. See also, https://www.mathworks.com/products/matlab/features.html#matlab_is_designed_for_engineers_and_scientists.

The foregoing references are incorporated into this specification by reference as if fully set forth herein in their entirety.

Preferably, in accordance with the present invention, the following analytic systems and processes utilize and act on data at the master station level to produce an analytic work product ("AWP"), stored locally and on other servers, assess event data against multiple behavior models developed for the structure under consideration, for example, a given bridge or multiple bridges, such as those under an owner's or operator's railway lines, and create timely advisory messages and periodic status reports, among the other transformed measured data as described in this specification:

1. Preprocessing.

In one of the early steps in the operation of the system, the present invention conducts signal processing and extracts a usable signal from the raw data that is produced and transmitted by the sensors and sensor modules in connection with the monitoring of a structure. In the first instance, raw data typically includes a considerable amount of noise and may be described as chaotic with a large degree of non-homogeneity in frequency content, especially for live load situations; ambient data may require excision of brief periods of excessive noise. The operations that are performed on data in accordance with the present invention include detection and categorization of the event of interest, conversion of measured quantities into physical units, calibration, orientation to a common coordinate system, time synchronizing data from different sensors, and various filtering operations to reduce noise and provide desired bandwidths for various subsequent computations. Different preprocessing is applied to accelerometer, gyroscope, and magnetometer data.

In providing a solution to problems associated with the preprocessing of raw data, the present invention comprises a data synchronization process utilizing a novel statistical approach to repeatedly measure the clock times in the sensors and compare them with the clock time in the master station. In general, analysis of the variations in the offset of a sensor time from master station time are used to calibrate the sensor clock. This method corrects for time variations that occur in the message transmission from the master station to the sensors due to interference, noisy communication links, or delays in the sensor message queue.

Data Synchronization Calibration

Methods, Requirements and Calculations

The following discussions and Examples set forth the data, methods, calculations and requirements for synchronizing the data collected from a set of sensor modules on a bridge segment connected into a single network including a single master station, such as master station for bridge monitoring, i.e., a bridge master station ("BMS"). The method for synchronizing the data is based on the creation of a calibration table. See FIG. 4.

As shown in FIG. 4, the BMS queries each sensor module multiple times 31, computes a sensor module offset 32 and records the offsets in the calibration table as shown as 33. The calibration table will provide temporal offset information to the analytics, described below, which will allow the analytic system to automatically synchronize the collections from the various sensors on a given bridge. These operations set forth a method(s) for populating the calibration table with sufficient accuracy to assure synchronicity between the sensor modules and the master station. The method is intended to reduce or eliminate data sync errors caused by delays in message delivery to the sensor module from the master station.

The following terminology is used herein. The sensor module data timing signal is used to drive a digitization process. The data timing signal at 800 Hz creates acceleration, gyroscope, and magnetometer signals and comes from the timing chip. A data clock is a register that keeps a running count of the number of ticks of the data timing signal.

Further, as shown in FIG. 5, the calibration table of FIG. 4 transmits offset data 40 for each sensor module to the analytics preprocessor 41. As shown, the analytics preprocessor time aligns data collected from each sensor based on the offset. The analytic processor then processes the time-synchronized sensor data for use 42.

The synchronization method used in the examples takes into account the following assumptions and conditions:

A. The minimum time delay to send a message from the BMS to a sensor module and for the sensor module to read its data clock is the same for all sensor modules.
B. The BMS can send read messages to a sensor module at any time.
C. The reply time from the sensor module to the BMS does not matter.
D. The communication link retry delay time, as discussed below, can be variable.
E. The sensor module data clocks do not have to be set to the same count.
F. The sensor module data clocks are free-running and are not set to any particular count at any time. (They could be so set if desired for other reasons, but this is not required for data sync.)
G. Each sensor module stores the data clock count of the last (or first, or both) sample collected in the header.

The examples below use milliseconds ("ms") as the time unit for simplicity. Actual clock values would be in counts at the clock rate for either the BMS or the sensor module. Clock rate conversions are not illustrated.

Examples of the Data Synchronization Methods

The following examples assume that the calibration table for one sensor module is created. Creating those for the other sensor module s is similar and independent.

Example 1.1

No Send Message Retries

Table 2 shows the BMS requesting the sensor module to read and report back its data clock count at various times. In this case, there is a 5 ms minimum delay associated with the send-read operation, which is assumed to remain about constant for all sensors. Here, only one sensor is being interrogated, since they do not all have to be done at the same time. The BMS reads its own clock register when it sends the message to the sensor module, not when it gets the reply. The sensor module replies to the BMS with the data clock count(s) it reads when it receives the message. Reply delays do not affect the result. Two reads of the sensor module data clock are shown. Both agree on the offset between the BMS and data clocks because the message propagation times are the same. The clocks do not drift noticeably during the data sync calibration process.

Some important factors are shown in this example:

A. The BMS stores its clock count in the calibration table when sending a message.
B. The sensor module reads its data clock count when the message is received.
C. The BMS stores sensor module data clock count and computes offset on reply; the offset is (BMS clock count)−(sensor module clock count).

TABLE 2

| BMS clock count | Calibration table clock counts | | offset | Operation | Msg delay | SM clock count |
|---|---|---|---|---|---|---|
| | BMS | SM | | | | |
| 10850 | 10850 | | | BMS send msg -> | 5 | 100 |
| 10855 | | | | SM reads its clock | | 105 |
| 10860 | | 105 | 10745 | <- SM replies to BMS | 5 | 110 |
| some time later | | | | | | |
| 10950 | 10950 | | | BMS send msg -> | 5 | 200 |
| 10955 | | | | SM reads its clock | | 205 |
| 10960 | | 205 | 10745 | <- SM replies to BMS | 5 | 210 |

From this table it is noted that both of the offsets for this sensor module are the same, 10745. No further calculations are necessary to get the offset needed for data synchronization.

The time of last data collection sample is recorded in the header from this sensor module. If it were 0, for example, the time of last sample in the BMS clock time could be found as offset+sensor module clock=10745+0=10745. This calculation would be similar for any other sensors modules. Further, note that the calculated time of reading the sensor module clock register the first time is 10745+105=100850 from the calibration table values. This value is actually 5 ms early, the amount of the propagation delay, since the sensor module actually read its clock at 10855. It does not matter that all of the data sync values will be 5 ms off. What does matter is that they will all be the same amount off from the BMS clock time. Absolute time is not required for data sync. One does not not need to know when the data was taken to within 1 ms of GPS or UTC or BMS time.

Example 1.2

With Send Message Retries

Not all sensor modules will receive the read message from the BMS on the first try. The next example shows three tries to read a sensor module data clock when the send propagation delays are different. The sensor module data clock has a different starting count, showing that all of the SMs do not have to be set to the same clock count for this method to work. The operations and results are set forth in Table 3.

TABLE 3

| BMS clock count | Calibration table clock counts | | offset | Operation | Msg delay | SM clock count |
|---|---|---|---|---|---|---|
| | BMS | SM | | | | |
| 10850 | 10850 | | | BMS send msg -> | 15 | 310 |
| 10865 | | | | SM reads its clock | | 325 |
| 10870 | | 325 | 10525 | <- SM replies to BMS | 5 | 330 |
| some time later | | | | | | |
| 10950 | 10950 | | | BMS send msg -> | 10 | 410 |
| 10960 | | | | SM reads its clock | | 420 |
| 10965 | | 420 | 10530 | <- SM replies to BMS | 5 | 425 |

TABLE 3-continued

| BMS clock count | Calibration table clock counts | | | Operation | Msg delay | SM clock count |
|---|---|---|---|---|---|---|
| | BMS | SM | offset | | | |
| later . . . | | | | | | |
| 11050 | 11050 | | | BMS send msg -> | 5 | 510 |
| 11055 | | | | SM reads its clock | | 515 |
| 11060 | | 515 | 10535 | <- SM replies to BMS | 5 | 520 |

Note that in Table 3 the calibration table now has different offset values. The largest one, 10535, is associated with the fewest number of send retries from the BMS to the sensor module, and is the one chosen as the best estimate of the offset between the clocks. Assuming that both sensor modules stopped collecting at exactly the same time (10850 on the BMS clock), then the clock time in this sensor module would have been 210 when the last sample was collected, and the BMS time of last sample collected is 10535+210=10745. This matches the data sync time from the sensor in the previous example.

Summary of the Data Synchronization Requirements Used in the Examples

The data sync requirements as used in the forgoing data sync Examples are as follows. Note that one of ordinary skill in the art may find that in making and using other embodiments or aspects of the present invention, not all such requirements may apply or may some may be varied.

A. The desired accuracy of the clocks used in the data synchronization over a collection and data sync calibration table creation interval of 200 sec is 1-2 ms. 0.625 ms is preferred.
B. The clock resolution minimum is 1 ms.
C. The sensor modules write a clock register value to the header associated with first or last sample collected.
D. The clock value in the header is a counter of some sub-multiple of the data strobe clock signal of around 800 Hz.
E. The BMS can send a message to read the data strobe clock count in an SM at any time.
F. The BMS can read its own clock count at any time.
G. The BMS can construct a data sync calibration table for each sensor with up to 50 entries as shown in the examples.
H. The data sync calibration table for each sensor is stored in the header data for each sensor event.
I. The clock registers should overflow after at least one day.
J. The clocks in the sensor modules should not be reset during a collection period. A clock count rolling over to zero is acceptable.

Clock Chip Performance

Table 4 shows the performance of various clock chips for the data synchronization requirements. The sample rate used is 800 Hz.

TABLE 4

| Parameter | Clock 1 | Clock 2 | Clock 3 |
|---|---|---|---|
| Stability, ppm | 5 | 20 | 250 |
| Time interval, sec | 200 | 200 | 200 |
| Drift, msec | 1 | 4 | 50 |

TABLE 4-continued

| Parameter | Clock 1 | Clock 2 | Clock 3 |
|---|---|---|---|
| Drift, samples | 0.8 | 3.2 | 400 |
| Acceptability | meets goal | meets req | No |

2. Kinematics.

Kinematic quantities describe the motion of the bridge components based on the acceleration and angular rotation measured by the sensors. The derivation of velocity, displacement, and angle of rotation require the solution of differential equations relating displacement to velocity, velocity to linear acceleration, and, separately, angle to angular velocity. Solution of these equations using noisy measurement data can result in severe distortions produced by the noise, which is amplified by the integration process.

A different approach is employed by the present invention. In an embodiment of the present invention, displacement is directly calculated from the acceleration data. Also, velocity data is generated by differentiation, which produces much smaller errors than integration does.

Gyroscope sensors are also used to correct the linear acceleration data. Linear acceleration of the gyroscope does not distort the angular velocity measurement, but angular rotation of the accelerometer distorts the acceleration measurements. This is effect is important because the large value g introduces a significant component of acceleration into the other axes, especially if they are aligned more horizontally rather than vertically.

The present invention also uses ambient data collections to measure changes in the orientation of any of the sensors over time. Ambient data is collected periodically or at times of special interest. The accelerometer data is used to measure the direction of gravity, which can be accurate to 0.01 degrees or more depending on the length of the data record. Magnetometer data is used to measure the direction of the magnetic field, which has about four times less precision due to its lower sample rate.

3. Frequency Analysis.

Structures resonate at specific frequencies more than at other frequencies, and changes in the resonant frequency of vibration indicate significant changes in the behavior of the structure. The presence of non-linear variation of a resonant frequency with amplitude indicates how the stiffness of a component varies with frequency, that is, whether the component can be viewed as stiff or flexible. Resonance is handled differently in timber and steel structures since steel can produce higher frequencies and more harmonics of a resonant frequency.

In events including impulses or shocks to a structure, which are high amplitude, high frequency signals produced occasionally within the data record, can indicate the presence of deformation, for example, in the rails, wheels or misalignment of bridge components. Impulses generate a high amplitude signal that is well defined in time, lasting perhaps only a few msec, or possibly ringing for a longer time, that are useful for measuring propagation delay within a component and for measuring the transmission of the signal between components, revealing additional information about the connections within the bridge.

The behavior of frequency and amplitude are used to derive bridge parameters such as stiffness, damping, mode energy, non-linearity, and propagation velocity.

4. Mode Analysis.

A structure, such as a bridge, has modes of oscillation when excited by dynamic forces. Using the time-aligned kinematic quantities, the modes of oscillation in the vertical, lateral, and longitudinal directions can be extracted and visualized if desired. The form of these modes is usually simple moving or oscillating waves, rotations, twists, and swaying.

5. Feature Extraction to Analytic Work Product ("AWP").

Each of the processing steps described above results in a set of parameters that summarize various aspects of the dynamic or static condition of a structure for a particular event such, in the case of a bridge, as a train crossing or in an ambient collection. The extracted parameters are saved for further analysis on the master station as the analytic work product. Each event is accompanied by header information describing the full conditions under which the data was taken including date and time; bridge identification and type; temperature; wind speed and direction; rain, snow, or icing conditions.

6. Consolidation of AWP to a Database.

The AWP for each event, consisting of the header description and the parameters extracted from the raw data for all sensors, and, again, in the case of a bridge structure for each bridge are collected in a searchable database. Data taken under similar condition is found by setting ranges for search parameters including date, time, bridge id, bridge type, bridge component, event type, temperature, moisture type and level, and sensor. Data can be retrieved for one bridge or for similar components of all bridges.

7. Structure Model Construction.

The searchable data base provides a large fast-growing collection of data from all instrumented structures and can be used to construct various types of models for each structure in the system. For example, in the case of the monitoring of bridges, the bridge model is essentially a summary of the bridge behavior with envelopes or operating limits that allow the data collected by the BMS on each bridge to compare AWP parameters with the AWP from the most recent event and determine the current bridge condition or status and whether an advisory report needs to be generated due to some out-of-range parameter. None of these models requires any advanced modeling such as finite element models of any structure or part of any structure. The models are based on the behavior of actual bridges as measured by the consistent, repeatable installation of the present invention sensors in each case.

Three types of bridge models are within the scope of the present invention:

Model One is a trend line for each sensor with acceptable operating limits. This model measures current state and rate of change of various parameters associated with a sensor. Preferably, this model requires collection of data over a relatively long time period to become effective.

Model Two is a component model compiled from the behavior of similar components (top caps, stringers, pilings) of the same bridge. This model allows detection of anomalous, inconsistent, or asymmetric behavior of one component versus the others. It can be used from installation onward, and does not require a long time for initialization.

Model Three is a complex composite model derived from similar structures and a variety of similar types of bridges under similar conditions. This model is similar to Model Two, but uses a much wider variety of data to identify bridges that are not like most of the others.

The bridge models for each bridge are repeatedly updated as more data becomes available for each bridge. The model development and updating is done at a central location that has access to all of the collected AWP from all of the bridges.

8. Assessment and Reporting.

The BMS rapidly obtains the AWP after each event occurs on its bridge. It uses one or more of the currently installed local bridge models to evaluate the AWP parameters and determines if one or more are out of operating limits. The BMS then updates the bridge status and may send an advisory report notifying authorities of the need for additional data or for an on-site inspection.

9. Scalability

At least one embodiment of the system of the present invention is scalable, and a matrix of multiple systems and structures can be created whereby multiple master stations take data collected over a period and transmits it to a central server(s). The central server sees the data files for many structures, such as bridges, and generate multiple reports from all collected bridges. Thus, the present invention analytics, reports and data from an entire railway system. In so doing, the present invention can analyze data for each bridge, and compile an historical record for a bridge that is used to create a bridge model comprising each measured parameter, and create trend lines for an historical record for further use.

The foregoing descriptions in this specification, as well as the drawings, are examples of embodiments of the present invention, and should not be construed as limiting the scope of the invention. These and other variations in the components, systems and methods of the invention will be obvious to those of ordinary skill in the art.

The invention claimed is:

1. A system for monitoring structural health of a structure, comprising:
   a plurality of sensors attached to the structure and configured to detect phenomena associated with a physical state of at least a part of the structure; and
   a master station,
   wherein:
      the plurality of sensors is configured to:
         measure and convert the detected phenomena into digital data; and
         transmit the digital data to the master station; and
      the master station is configured to:
         receive the digital data;
         infer, from the digital data and a component model, an asymmetrical behavior of a component of the structure versus other components in a plurality of components of the structure,
         wherein:
            the component of the structure is in the plurality of components of the structure; and
            the component model is based on:
               behavior of the plurality of components of the structure, as measured by the plurality of sensors; and
               analytic work product obtained from prior analysis of conditions of the structure; and
         generate an output that describes the asymmetrical behavior of the component of the structure.

2. The system of claim 1, wherein the master station is configured to produce output data describing sensed physical structural measurements comprising at least one of kinematics, frequency, or mode.

3. The system of claim 1, wherein the master station is configured to produce at least one of:
 a report describing the output; or
 an advisory communication describing the output.

4. The system of claim 1, wherein the master station is configured to:
 collect the digital data over a period; and
 transmit the digital data to another computing device.

5. The system of claim 1, wherein the plurality of sensors is configured to transmit the digital data to the master station via a wireless network.

6. The system of claim 1, wherein the master station is configured to wirelessly transmit instructions to the plurality of sensors.

7. The system of claim 1, wherein the master station is configured to construct the component model based on the behavior of the plurality of components of the structure, as measured by the plurality of sensors.

8. The system of claim 1, wherein the master station is configured to determine, from the digital data, time-aligned kinematic quantities describing changes in live load kinematics of the component of the structure.

9. The system of claim 1, wherein the plurality of sensors is configured to take readings of the structure while the structure is experiencing a load.

10. The system of claim 1, wherein the plurality of sensors is configured to use standard clock time.

11. The system of claim 1, wherein the plurality of sensors comprises at least one of an accelerometer, a gyroscopic sensor, a magnetometer, an infrared sensor, or a wind sensor.

12. The system of claim 1, wherein the plurality of sensors comprises a support means and at least one of: a battery, a solar power unit, a programmable logic unit, a memory, a digitizer, and a WIFI device.

13. The system of claim 1, wherein the plurality of sensors is configured to perform data processing.

14. The system of claim 1, wherein the master station is configured to transmit analysis results to a central server, wherein the central server is configured to perform at least one of data storage, data processing, data analysis, or generating an output.

15. The system of claim 1, wherein the master station is configured to:
 maintain a structure model of the structure; and
 update the structure model as a result of cyclic monitoring of the structure.

16. The system of claim 1, wherein the plurality of sensors is configured to enable the system, based on predetermined criteria, to assess whether all or part of a structure is:
 within at least one of preset limits or thresholds; or
 has exceeded the at least one of the preset limits or the thresholds.

17. The system of claim 1, wherein the master station is configured to monitor at least one additional structure.

18. The system of claim 1, wherein the component model is a bridge model, the structure is a bridge, and the component model further comprises operating limits.

19. The system of claim 1, wherein the component model is a bridge model, the structure is a bridge, and the component model is compiled from behavior of the plurality of components of the bridge.

20. The system of claim 1, wherein the master station is configured to update a composite structure model from the component model.

21. The system of claim 1, wherein the plurality of sensors is mounted to a bridge.

22. The system of claim 21, wherein the bridge is a railway bridge.

23. The system of claim 22, wherein the plurality of sensors is configured to take readings of the railway bridge at least one of before, during, or after a train moves over the bridge.

24. A method for monitoring structural health of a structure, comprising:
 collecting digital data from a set of sensor modules mounted on the structure and configured to detect phenomena associated with a physical state of at least a part of the structure;
 inferring, at a master station and from both the digital data and a component model, an asymmetrical behavior of a component of the structure versus other components in a plurality of components of the structure,
 wherein:
  the component of the structure is in the plurality of components of the structure; and
  the component model is based on:
   behavior of the plurality of components of the structure, as measured by the set of sensor modules; and
   analytic work product obtained from prior analysis of conditions of the structure; and
 generating an output that describes the asymmetrical behavior of the component of the structure.

* * * * *